United States Patent [19]

Collins, Jr. et al.

[11] Patent Number: 5,056,007
[45] Date of Patent: Oct. 8, 1991

[54] CROSS-COUPLING OF SERVICE PROCESSOR DRIVEN SYSTEM CONTROL FACILITIES IN A MULTIPLE SERVICE PROCESSOR DATA PROCESSING SYSTEM

[75] Inventors: Eddie "B" Collins, Jr., San Jose; Arun Shah, Cupertino; Louie M. Giambattista, San Francisco, all of Calif.

[73] Assignee: Amdahl Corporation, Sunnyvale, Calif.

[21] Appl. No.: 434,553

[22] Filed: Nov. 8, 1989

Related U.S. Application Data

[63] Continuation of Ser. No. 136,906, Dec. 22, 1987, abandoned.

[51] Int. Cl.[5] .............................................. G06F 15/16
[52] U.S. Cl. ................................. 364/200; 364/230.6; 364/242.6; 364/228.3
[58] Field of Search ... 364/200 MS File, 900 MS File

[56] References Cited

U.S. PATENT DOCUMENTS

| 4,306,288 | 12/1981 | Nakamura | 364/200 |
| 4,315,311 | 2/1982 | Causse et al. | 364/200 |
| 4,455,601 | 6/1984 | Griscom et al. | 364/200 |
| 4,752,907 | 6/1988 | Si et al. | 364/900 |
| 4,875,159 | 10/1989 | Cary et al. | 364/200 |

*Primary Examiner*—Thomas M. Heckler

[57] ABSTRACT

A data processing system includes system control facilities for monitoring and controlling the system. A first service processor, under program control, drives the system control facilities to perform service functions for the data processing system. A second service processor, independently under program control, also drives the system control facilities to perform service functions for the data processing system. An arbitrating circuit cross-couples each system control facility to the respective service processors and arbitrates the transfer of data and control signals between each given system control facility and the given service function running on the given service processor which currently has possession and control of the given system control facility.

16 Claims, 3 Drawing Sheets

CROSS-COUPLING OF SERVICE PROCESSOR DRIVEN SYSTEM CONTROL FACILITIES IN A MULTIPLE SERVICE PROCESSOR DATA PROCESSING SYSTEM

This is a continuation of U.S. patent application Ser. No. 136,906, filed Dec. 22, 1987, now abandoned.

BACKGROUND OF THE INVENTION

1. Field of the Invention

This invention relates to data processing systems which include a plurality of service processors for monitoring and controlling system operation. More particularly, the present invention relates to cross-coupling of the system monitor and control facilities that are driven by the plurality of service processors.

2. Description of Related Art

Previous models of large high speed computers such as the Amdahl 5890 include system control facilities driven by a service processor. These system control facilities called SCAN and CIC are used under control of the service processor to initialize the data processing system, to start and stop system clocks, to monitor the system for errors, to take machine logs, to perform recovery algorithms, to perform testing operations and to provide other services.

SCAN is a system which provides the ability to set and query the state of latches and RAMs in the processor system, independent of the normal data paths within the system. A typical SCAN system is described in U.S. patent application entitled SERIAL CHIP SCAN, Ser. No. 06/880,106, filed June 30, 1986, now U.S. Pat. No. 4,752,907 entitled INTEGRATED CIRCUIT SCANNING APPARATUS HAVING SCANNING DATA LINES FOR CONNECTING SELECTED DATA LOCATIONS TO AN I/O TERMINAL and in U.S. patent application entitled MULTIMODE SCAN APPARATUS, Ser. No. 07/040,738; filed Apr. 15, 1987, now U.S. Pat. No. 4,819,166, which are owned by an assignee in common with the present application and incorporated by reference.

The CIC (Console Immediate Control) facility is used for setting and querying the state of selected input/output pins within the system regardless of the state of the system clocks.

The monitoring and control functions provided by a service processor are crucial to system operation. Accordingly, it is desirable to have a back up or redundant service processor. Prior art systems including back up service processors are typified by the system described in U.S. Pat. No. 4,455,601 entitled CROSS-CHECKING AMONG SERVICE PROCESSORS IN A MULTI-PROCESSOR SYSTEM, invented by Griscom et al. In the Griscom et al. system, at system initialization, one of the service processors is designated primary while the remaining service processor is dormant. A special support adapter monitors various aspects of the active service processor, and upon detection of a predetermined condition, causes the dormant service processor to assume control of the system, while the previously active service processor becomes dormant.

While the Griscom et al. system provides the desirable backup service processor, it suffers the disadvantage that in order to swap roles of the service processors, each service processor must be re-initialized through an initial microcode load process. In addition, the backup service processor in the Griscom et al. system lies dormant, such that the processing resources within the dormant processor are wasted.

Accordingly, a redundant service processor system which allows greater flexibility in dynamic allocation of system control facilities is desirable.

SUMMARY OF THE INVENTION

The present invention provides means for cross-coupling the system control facilities in a data processing system, such that dynamic allocation of the system control facilities can be made among a plurality of active service processors. This system allows great flexibility for a programmer of the service processor to make optimal use of the service processing facilities, while providing a high degree of redundancy at the service processor level.

According to the present invention, in a data processing system that includes system control facilities for monitoring and controlling the system, an apparatus is provided for controlling the system control facilities. The apparatus comprises a first service processor operable under program control for driving system control facilities to perform service functions for the data processing system, and a second service processor operable under program control, for driving the system control facilities to perform service functions for the data processing system. An arbitrating means, connected to the first service processor and the second service processor and to the system control facilities, provides cross-coupling of the system control facilities to the service processors and arbitrates the transfer of data and control signals between the system control facilities and service functions running in the first and second service processors.

DESCRIPTION OF THE PREFERRED EMBODIMENT

Figure 1:
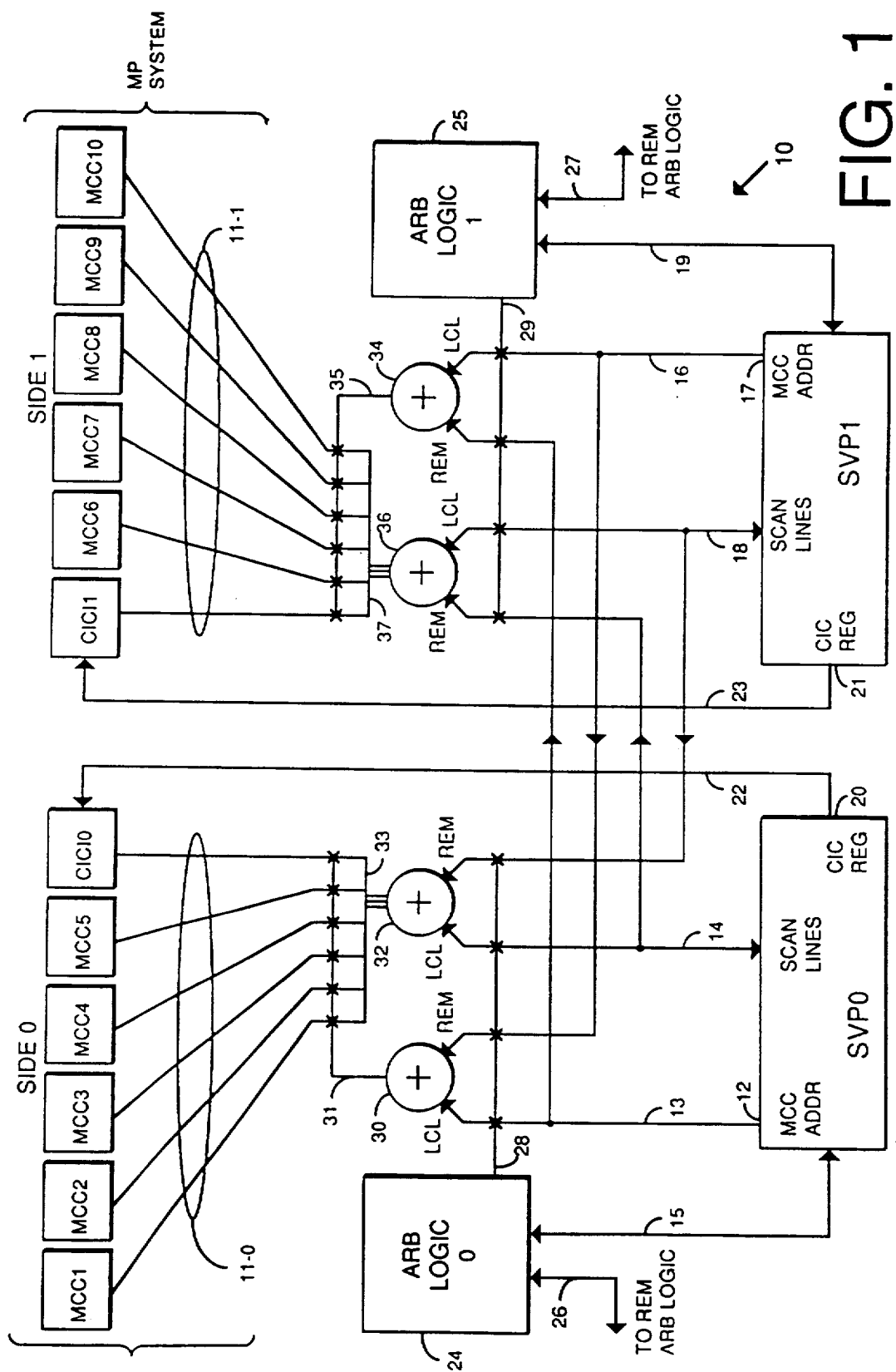
FIG. 1 is a block diagram of the data processing system having two service processors according to the present invention.
Figure 2:
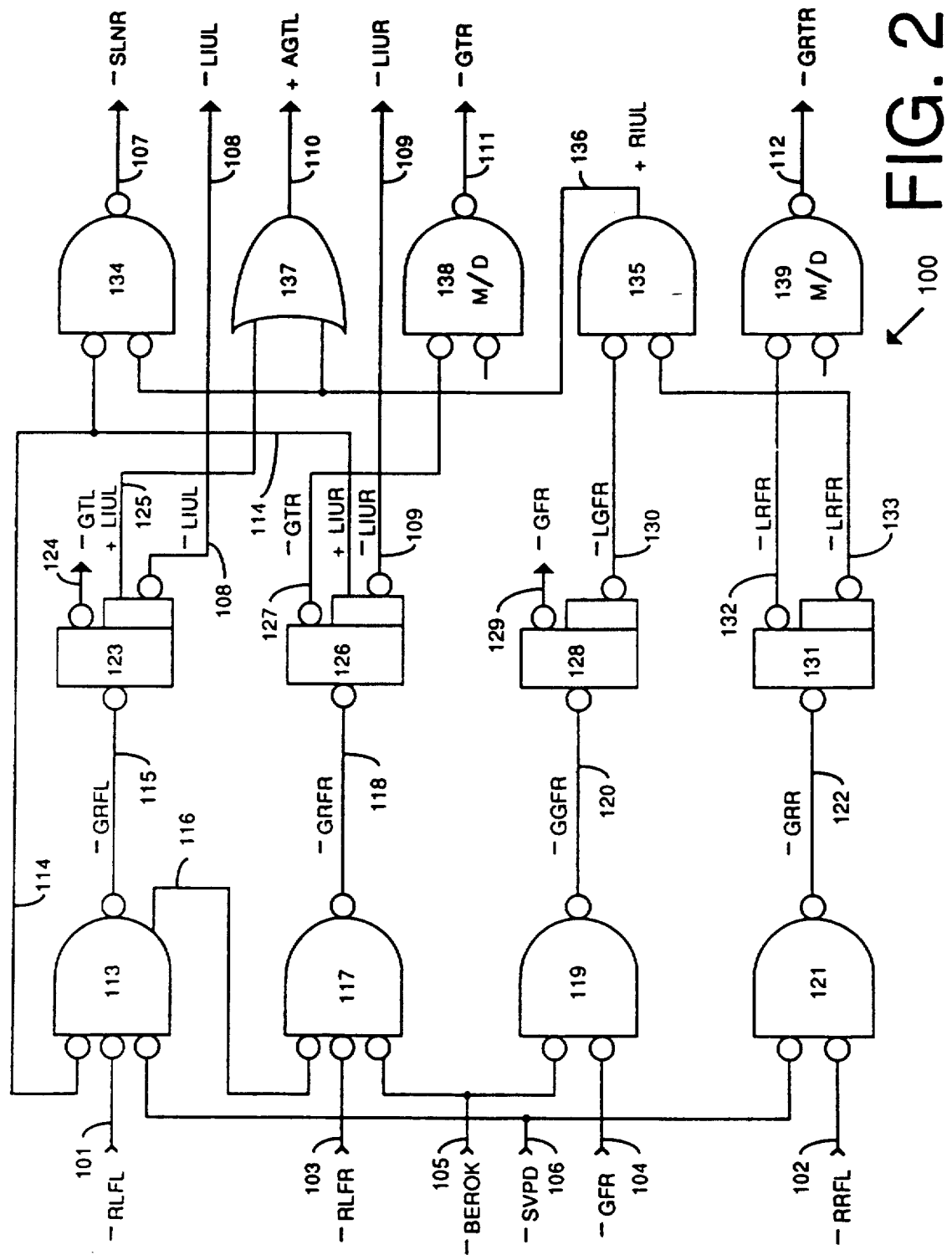
FIG. 2 is a logic diagram of the arbitration logic in the system shown in FIG. 1.
Figure 3:
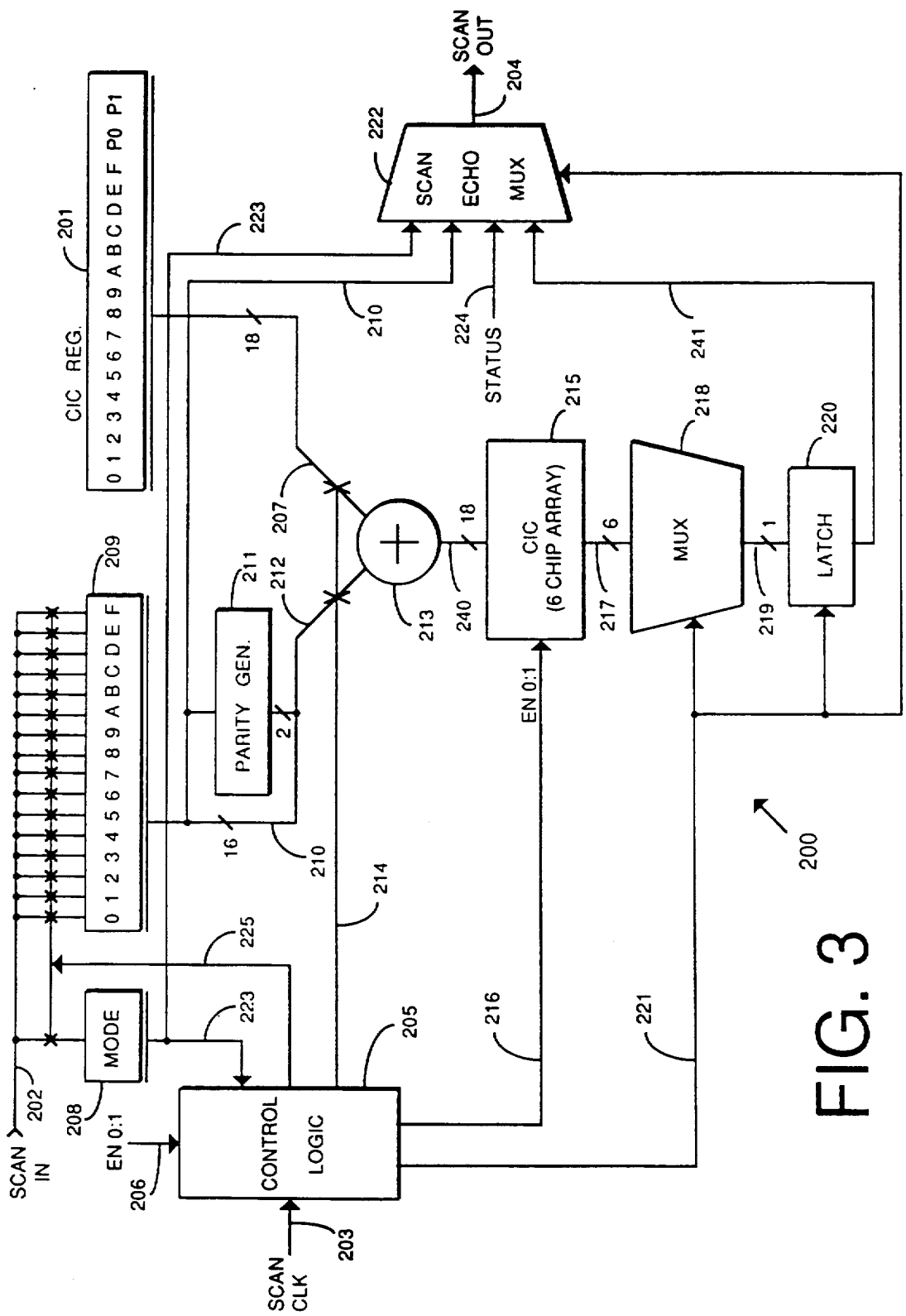
FIG. 3 is a block diagram of the CIC interface cross-coupling for the system shown in FIG. 1.

The preferred embodiment of the present invention is described with reference to FIGS. 1-3. With reference to FIG. 1, the multiple service processor system according to the present invention is described. With reference to FIGS. 2 and 3, implementation of the arbitration logic and the interface for cross-coupling the CIC facility is described.

The preferred embodiment of the present invention is a multi-processor system comprising two otherwise independent systems designated side 0 and side 1 in FIG. 1, which are linked to increase performance. Both side 0 and side 1 of the multi-processor system include an associated service processor, SVP0 and SVP1, respectively. The system control facilities (SCAN and CIC), in side 0 and side 1 of the multi-processor system are cross-coupled through the circuit generally designated by the reference numeral 10 which provides dynamic allocation of the system control facilities in side 0 and side 1 to the service processors SVP0 and SVP1.

The multi-processor system of the preferred embodiment is physically implemented using integrated circuit technology. The integrated circuits are mounted in a plurality of multiple chip carriers (MCC) each carrying a block of integrated circuits and associated components. In the figure, side 0 includes MCC1-MCC5 and side 1 includes MCC6-MCC10. It will be understood that in large-scale multiprocessing systems, there can be large numbers of MCCs. The five MCCs on each side shown in FIG. 1 are meant to illustrate the concepts of the present invention. Within the MCCs, a SCAN facility is provided, such as that described in the U.S. patent applications cross-referenced above.

In addition to the SCAN facility, a CIC facility is provided within each of the MCCs on both sides. Associated with the CIC facilities is a CIC interface for each side (CICI0 and CICI1). Provided in FIG. 3 is a block diagram of the CICI interface as it pertains to the present invention.

Data and control signals are transferred to MCC1-MCC5 and CICI0 interfaces across the system interface set 11-0 for side 0. Likewise, data and control information are transferred to MCC6-MCC10 and CICI1 on side 1 across system interface set 11-1. The signals supplied across the system interface sets 11-0 and 11-1, are driven by service processors SVP0 and SVP1 through the cross-coupling circuit 10.

SVP0 includes an MCC address register 12 which supplies the MCC address across line 13 to the circuit 10. In addition, SVP0 supplies control and data across scan lines 14 to the apparatus 10. Finally, request, grant and status information is communicated across line 15 between SVP0 and the apparatus 10.

Likewise, SVP1 supplies an MCC address on line 16 from its MCC address register 17. Data and control information is supplied across scan lines 18 from SVP1 and request, grant and status information is communicated on lines 19 with the apparatus 10. In addition, both SVP0 and SVP1 include a CIC register 20, 21, which supplies the CIC control and data across lines 22, 23, to the CIC interfaces, CICI0 and CICI1, on side 0 and side 1, respectively.

Through the cross-coupling and arbitrating circuit 10, the scan lines and MCC address lines from SVP0 and SVP1 are cross-coupled to the system interface sets 11-0 and 11-1. The circuit 10 includes arbitration logic 24 on side 0 and arbitration logic 25 on side 1. The arbitration logic 24 on side 0 is connected to communicate the request, grant and status information across line 15 with SVP0. It is also connected to remote arbitration logic across lines 26. The remote arbitration logic connected to lines 26 in the system shown in FIG. 1 is the arbitration logic 25 for side 1.

The arbitration logic 25 for side 1 is connected to communicate the request, grant and status information on line 19 with service processor SVP1 and to supply control information across lines 27 to the remote arbitration logic. The remote arbitration logic connected to lines 27 in the system shown in FIG. 1 is arbitration logic 24 for side 0.

The arbitration logic 24 generates switch control signals on line 28 which are coupled to the MCC address from SVP0 on line 13, the MCC address from SVP1 on line 16, the scan lines from SVP0 on line 14 and the scan lines from SVP1 on line 18 in order to control gating of the signals on the respective lines, as indicated by the "X" on the line. Likewise, arbitration logic 25 on side 1 generates switch control signals on lines 29 which are coupled to control gating of the signals on the MCC address lines 16 from SVP1, MCC address lines 13 from SVP0, scan lines 18 from SVP1 and scan lines 14 from SVP0.

The MCC address on lines 13 from SVP0 and MCC address on lines 16 from SVP1 are connected through the switches that are controlled by the control signals on line 28 to an OR-array 30. The output of the OR-array is an MCC address on lines 31 which is used to switch the scan lines in the system interface set 11-0.

The scan data and control information on lines 14 from SVP0 and on lines 18 from SVP1 are coupled through the switches that are controlled by the signals on lines 28 to the OR-array 32. The output of the OR-array 32 is supplied on lines 33 for supply through the switches that are controlled by the control signals 31 as the system interface set 11-0.

On side 1, the MCC address on line 16 from SVP1 and the MCC address on lines 13 from SVP0 are connected through switches controlled by control signals on line 29 to the OR-array 34. The output of the OR-array is a selected MCC address which is used to control switches that gate the system interface set 11-1.

The scan data and control signals on lines 18 from SVP1 and on lines 14 from SVP0 are connected through switches controlled by the control signals on lines 29 to OR-array 36. The output of the OR-array 36 is fanned out on lines 37 through the switches controlled by the signals on lines 35 as the system interface set 11-1.

Through the cross-coupling and arbitrating circuit 10, dynamic allocation of the system control facilities on side 0 and side 1 is provided for the two concurrently active service processors. Each service processor is allocated a particular system control facility only for the duration of the system control operation run on that service processor. Then the facility is freed so that the other service processor can use it. The arbitrating logic 24, 25 controls this dynamic allocation of resources.

Protocols at the software level in the service processor must be used to avoid destructive interference. In general, the service processor software on one side is adapted to manage only its local disks and terminals and uses the system control facilities for monitoring the state of the system. The service processor on the other side will do both monitoring and control operations using the system control facilities for both sides of the system. However, there are cases where performance is increased by allowing both service processors to perform system control operations in parallel, or to allow the service processor on side 0 to perform system control operations on side 1 of the data processing system, while the service processor on side 1 performs control operations on side 0 of the data processing system. The arbitration circuit 10 functions to connect the system interface sets 11-0 and 11-1 to SVP0 or SVP1 based on requests and status signals generated by the service processors. The service processor selects which system interface set it wishes to use by making a request to the arbitration logic 24, 25; the arbitration logic insures that the desired system interface set is not being used and then returns a grant to the requesting service processor. If service processor 1 makes a request for access to the system interface set on side 0, arbitration logic 25 on side 1 provides the interface signals to the remote arbitration logic 24 on side 0 in order to gain access to system interface set 11-0 on side 0. When a service operation completes, the service processor drops its request in order to signal the arbitration logic 24, 25 that the system interface set has become available.

The arbitration logic 24, 25 is set out in detail in FIG. 2. The input signals to FIG. 2 include the request and status information from the local service processor (e.g., across lines 15 for arbitration logic 24), the cross-coupling control signals from the remote arbitration logic (e.g., across lines 26). The outputs from the arbitration logic include the switch control signals for the local interface set (e.g., on lines 28 for controlling interface set 11-0), the control signals for supplying to the remote arbitration logic (e.g., across lines 26) and the grant signals.

As illustrated in FIG. 2, the request signals from the local service processor include the "request local from local" signal RLFL on line 101 and the "request remote from local" signal RRFL on line 102. The cross-coupled control signals from the remote arbitration logic include the "request local from remote" signal RLFR on line 103 and the "grant from remote" signal GFR on line 104. The service processor status signals include the "both enable remote" signal BEROK on line 105 and the "service processor damage" signal SVPD on line 106. (A minus sign in the figure preceding a signal name indicates that the signal is active low; a plus sign preceding a signal name indicates that the signal is active high.)

The outputs from the arbitration logic 100 shown in FIG. 2 include the "select local not remote" signal SLNR on line 107, the "local in use by local" signal LIUL on line 108, and the "local in use by remote" signal LIUR on line 109. The signals on lines 107-109 provide the switch control signals (e.g., on line 28), for controlling the cross-coupling of the MCC address and scan data and control signals from the service processors to the local interface set (e.g., 11-0).

The outputs from the arbitration logic 100 also include the "any grant to local" signal AGTL on line 110, the "grant to remote" signal GTR on line 111 and the "gated request to remote" signal GRTR on line 112. The signals on lines 111 and 112 are cross-coupled to the remote arbitration logic, the "grant to remote" signal on line 111 is connected as the "grant from remote" signal on line 104 in the remote arbitration logic and the "gated request to remote" signal on line 112 is connected as the "request local from remote" signal on line 103 in the remote arbitration logic.

The "any grant to local" signal on line 110 goes to the local service processor to tell it to proceed with its system control operation.

As can be seen in FIG. 2, the arbitration logic 100 includes AND-gate 113 which is connected to receive the RLFL signal on line 101 at one inverting input, the SVPD signal on line 106 at a second inverting input and a latched signal indicating that the local interface set is in use by the remote service processor across line 114. The output of AND-gate 113 is supplied through an inverting output on line 115 as a "gated request from local" signal, and through a non-inverting output on line 116 as a "gated request from local" signal.

The arbitration logic 100 also includes AND-gate 117 which is connected to receive the "request local from remote" signal on line 103 at an inverting input, the active high "gated request from local" signal on line 116 at a second inverting input and the "both enable remote" signal on line 105 at a third inverting input. The output of the AND-gate 117 through an inverting output is supplied on line 118 as a "gated request from remote" signal.

Arbitration logic 100 also includes AND-gate 119 which is connected to receive the "grant from remote" signal on line 104 at an inverting input and the "both enable remote" signal on line 105 at a second inverting input. The output of the AND-gate 119 through an inverting output is supplied on line 120 as the "gated grant from remote" signal.

AND-gate 121 is connected to receive the service processor damage signal on line 106 at a first inverting input and the "request remote from local" signal on line 102 at a second inverting input. The output of the AND-gate 121 is supplied on line 122 through an inverting output as a "gated request for remote" signal on line 122.

The signal on line 115 is supplied through an inverting output to master-slave latch 123 to supply an active low "grant to local" signal at the output of the master latch on line 124, an active high "local in use by local" signal from the slave latch on line 125 and the active low "local in use by local" signal on line 108.

The signal on line 118 is supplied to an inverting output to master-slave latch 126 which supplies an active low "grant to remote" signal on line 127 from the master latch, an active high "local in use by remote" signal on line 114 from the slave latch and an active low "local in use by remote" signal on line 109.

The signal on line 120 is supplied at an inverting input to the master-slave latch 128. The master output of the latch 128 is an active low "grant from remote" signal on line 129. An active low "latched grant from remote" signal is supplied from the slave latch on line 130.

The signal on line 122 is supplied to an inverting input to the master-slave latch 131. The master output of the latch 131 is supplied as an active low "latched request for remote" signal on line 132 and the slave output is supplied as a staged active low "latched request for remote" signal on line 133.

The "select local not remote" signal on line 107 is supplied at the output of the AND-gate 134 which receives at inverting inputs, the "local in use by remote" signal on line 114 and the output of AND-gate 135. AND-gate 135 receives through inverting inputs the "latched grant from remote" signal on line 130 and the "latched request from remote" signal on line 133. The output is a an active high "remote in use by local" signal. The "select local not remote" signal on line 107 is supplied active low through inverting output of gate 134.

The "any grant to local" signal on line 110 is supplied at the output of OR-gate 137 which receives as its inputs "local in use by local" signal on line 125 and the "remote in use by local" signal on line 136.

The "grant to remote" signal on line 111 is supplied at the output of gate 138 which receives at its input the "grant to remote" signal on line 127.

The "gated request to remote" signal on line 112 is supplied at the output of gate 139 which receives as its input the active low "latched request for remote" signal on line 132.

The master-slave clocking signals are not illustrated. However, the master-slave latches 123, 126, 128 and 131 are clocked by the same master-slave sample and hold clocks.

The arbitration logic shown in FIG. 2 implements the following rules:

1. Requests from the local service processor have priority over requests from the remote service processor.

2. Once a grant goes active, it remains active until the request drops.

3. When a service processor has no power or is not installed, its requests are ignored by the remote arbitration logic as indicated by the BEROK signal on line 105.

4. When an error condition exists on a service processor, its requests are ignored as indicated by the SVPD signal on line 106.

The BEROK signal is generated by special circuitry that is used to enable or disable the cross-coupled access to the scan mechanism. This control bit must be set on both service processors before cross-coupling access is allowed. This protects and prevents partitioned systems from affecting each other.

The CIC register 20 and 21 in the service processors as shown in FIG. 1 implement a parallel interface across lines 22 and 23 to the respective CICI interfaces (CICI0 and CICI1). In order to provide cross-coupling of the CIC register control information; however, the MCC address and scan lines facility of the service processors and system interface sets are used to access the CIC as well. The CIC interface facility is illustrated in FIG. 3, showing the connection of the scan lines to provide the cross-coupling of the CIC system control facility.

As illustrated in FIG. 3, the CIC register 201 corresponds to the CIC register resident on the service processor. The scan lines from the system interface set include the scan-in line 202, the scan clock 203 and the scan-out line 204. Control signals EN0:1 are supplied by the local service processor to control logic 205 across line 206 indicating whether a read or write access to the CIC facility is being carried out through the CIC register 201.

The control logic 205 generates the control signals to operate the CIC access.

The CIC register 201 includes 18 bits including 16 bits of data and control information and 2 parity bits which are supplied to the CIC interface across line 207. The scan-in line 202 sends a mode bit which is latched in register 208 followed by a string of 16 address and data bits 0-F which are successively latched in the 16-bit register 209. The latching of the mode address and data bits in the registers 208 and 209 is controlled through switches which are controlled by signals on lines 225, generated in the control logic 205. The output of the register 209 is supplied on line 210. A parity generator 211 is connected to line 210 and generates 2 parity bits which are combined with the 16 bits on line 210 to supply an 18-bit CIC data, address and parity signal on line 212.

Lines 212 supplying the CIC data and control information from the scan lines and the data on line 207 supplying the CIC control and data information from the service processor parallel interface, are connected to the OR-array 213 through switches controlled by signals on line 214. The output of OR-array 213 is supplied on line 240 to the CIC facility 215. The CIC facility is controlled to perform a read or write or other kind of access by the EN0:1 signal on lines 216 which are staged from the control logic 205 when the CIC facility 215 is available for access. The output of the CIC facility 215 includes six serial streams, one from each of six chips in the facility 215, which are supplied across line 217 to a multiplexer 218. The multiplexer selects one of the serial streams for supply on line 219 which is latched by latch 220. The multiplexer 218 and the latch 220 are controlled by control signals supplied by control logic 205 on lines 221. The output of the latch 220 is supplied on lines 241 to a scan echo multiplexer 222. Other inputs to the scan echo multiplexer include the output of the mode register 208 on line 223, the output of the 16-bit register 209 on line 210 and status information on lines 224. The status information is generated in the control logic 205. It indicates parity errors and access status for the CIC facility.

The scan echo MUX 222 is controlled by a control signal supplied on lines 221 from the control logic 205 to provide the output of the CIC access, and an echo of the scan mode, control and data information which was supplied across line 202.

Accordingly, the CICI chip on each side of the multiprocessor system looks like an MCC block to the scan hardware. When a microcode for a function in a service processor wants a CIC access, it writes the MCC address register with the address of the CICI chip, then writes the scan data register with CICI control and data information. The scan hardware then transfers the CIC information to the CICI chip which stores it in its 16-bit register 209. Once this register is loaded, the CICI chip waits until the CIC facility is available, then presents the data from the 16-bit register 209 to the CIC facility while asserting the enable signals based upon whether a read or write is requested. The data returned by the CIC facility is then latched and the value of this latch is returned to the requesting service processor via the scan-out data line.

CONCLUSION

According to the preferred embodiment, a multiprocessor system is provided in which two otherwise independent systems that may themselves include one or more processors, have been linked to increase performance levels. Each side of the multiprocessor system has a service processor associated with it. Ordinarily each service processor in the system would be indispensable. But, according to the present invention, the system control facilities in both sides of the system are cross-coupled with both service processors. Therefore, the system can now function with only one operational service processor, significantly improving the reliability of the overall system. Either service processor can take full control of both systems or either system, via the cross-coupled scan and CIC facilities.

This cross-coupling involves only those facilities required for control of the system, that is, SCAN and CIC. It does not link disks, terminals, modems, and other non-essential facilities in the service processors.

The hardware provides for dynamic allocation of the two system control facilities. Each service processor is allocated a particular system control facility only for the duration of the system control operation. That facility is then freed so the other service processor can use it. Allocation of facilities is on a first-come, first-served basis. Simultaneous requests result in the local service processor winning and the remote service processor waiting.

Enhanced performance of the service processor which is attained by allowing simultaneous cross-system scan is illustrated by the following example of log-out in the event of system error. In the event of a multiprocessor system error, the first function of each service processor is to log out the error, which comprises scanning out of the integrated circuit and RAM components in the multiprocessor system. The log-out must be done as quickly as possible to minimize the time that the system is not available. Each service processor must do its own log-out of both sides of the multiprocessor system because it is necessary to maintain identical file systems on both service processors in the event that one service processor goes down.

Having the ability to do simultaneous cross-system scan allows the log-out to complete in less time because the scan-out being done by the first service processor can be overlapped with scan-out being done by the other. Thus, side 0 can be scanned by service processor 0 while side 1 is scanned by service processor 1; then, side 0 is scanned by service processor 1 at the same time that side 1 is scanned by service processor 0.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to a particular use. It is intended that the scope of the invention be defined by the following claims and their equivalents.

We claim:

1. In a data processing system including a plurality of processing units performing host functions, with system control facilities in the plurality of processing units for monitoring and controlling the plurality of processing units independent of the host functions, an apparatus for controlling the system control facilities comprising:
   first service processing means, under program control, for controlling the system control facilities;
   second service processing means, under program control, for controlling the system control facilities;
   arbitrating means, connected to the first service processing means and second service processing means and to the system control facilities, for arbitrating the transfer of data and control signals for the system control facilities by the first service processing means and second service processing means.

2. The apparatus of claim 1, wherein the arbitrating means includes:
   interfacing means, connected to the plurality of processing units, for transferring data and control signals to and from the processing units;
   selecting means, connected to the interfacing means, the first service processing means and the second service processing means, for selecting the first service processing means or the second service processing means for access to the system control facilities.

3. The apparatus of claim 1, wherein the arbitrating means includes:
   first interfacing means, connected to a first set of the plurality of processing units, for transferring data and control signals to and from the first set;
   first selecting means, connected to the first interfacing means, the first service processing means and the second service processing means, for selecting the first service processing means or the second service processing means for access to the system control facilities in the first set;
   second interfacing means, connected to a second set of the plurality of processing units, for transferring data and control signals to and from the second set;
   second selecting means, connected to the second interfacing means, the first service processing means and the second service processing means, for selecting the first service processing means or the second service processing means for access to the system control facilities in the second set.

4. The apparatus of claim 1, wherein the system control facilities include:
   means for setting and querying data locations within the plurality of processing units.

5. The apparatus of claim 1, wherein the system control facilities include:
   means for setting and querying input/output pins within the plurality of processing units.

6. The apparatus of claim 1, wherein the system control facilities include:
   means for setting and querying data locations within the plurality of processing units; and
   means for setting and querying input/output pins within the plurality of processing units.

7. In a data processing system including a plurality of processing units performing host functions, the processing units including a plurality of blocks of integrated circuits with system control facilities coupled to the blocks for monitoring and controlling the plurality of processing units independent of the host functions, the blocks being identified by block addresses, an apparatus for controlling the system control facilities comprising:
   first service processing means, under program control, for generating data, control signals and block addresses controlling the system control facilities to operate on addressed blocks;
   second service processing means, under program control, for generating data, control signals and block addresses controlling the system control facilities to operate on addressed blocks;
   arbitrating means, connected to the first service processing means and the second service processing means and to the system control facilities, for arbitrating the transfer of data and control signals to addressed blocks for the system control facilities by the first service processing means and second service processing means.

8. The apparatus of claim 7, wherein the arbitrating means includes:
   first interfacing means, connected to a first set of the plurality of blocks and responsive to block addresses, for transferring data and control signals to and from addressed blocks in the first set;
   first selecting means, connected to the first interfacing means, the first service processing means and the second service processing means, for selecting the first service processing means or the second service processing means for access to the system control facilities in the first set;
   second interfacing means, connected to a second set of the plurality of blocks and responsive to block addresses, for transferring data control signals to and from addressed blocks in the second set;
   second selecting means, connected to the second interfacing means, the first service processing means and the second service processing means, for selecting the first service processing means or the second service processing means for access to the system control facilities in the second set.

9. The apparatus of claim 7, wherein the system control facilities include:

means, coupled to the blocks, for serving functions associated with one of the system control facilities within the plurality of blocks, including facility interfacing means, having a block address and coupled to receive the data and control information from the first and second service processing means when addressed by the block address, for communicating the data and control information with the first service processing means and second service processing means.

10. The apparatus of claim 9, wherein the arbitrating means includes:

first interfacing means connected to a first set of the plurality of blocks and the facility interfacing means and responsive to block addresses, for transferring data and control signals to and from addressed blocks in the first set and the facility interfacing means;

first selecting means, connected to the first interfacing means, the first service processing means and the second service processing means, for selecting the first service processing means or the second service processing means for access to the system control facilities in the first set;

second interfacing means, connected to a second set of the plurality of blocks and the facility interfacing means and responsive to block addresses, for transferring data and control signals to and from addressed blocks in the second set and the facility interfacing means;

second selecting means, connected to the second interfacing means, the first service processing means and the second service processing means, for selecting the first service processing means or the second service processing means for access to the system control facilities in the 11. The apparatus of claim 9, wherein the means, coupled to blocks of integrated circuits, for serving functions includes:

means, coupled to receive the data and control information from the first and second service processing means through the facility interfacing means, for setting and querying input/output pins within the plurality of blocks.

12. The apparatus of claim 7, wherein the system control facilities include:

means, coupled to receive the data and control information from the first and second service processing means, for setting and querying data locations within the plurality of blocks.

13. The apparatus of claim 7, wherein the system control facilities include:

means, coupled to receive the data and control information from the first and second service processing means, for setting and querying input/output pins within the plurality of blocks.

14. The apparatus of claim 7, wherein the system control facilities include:

means, coupled to receive and data and control information from the first and second service processing means, for setting and querying data locations within the plurality of blocks; and means, coupled to receive the data and control information from the first and second service processing means, for setting and querying input/output pins within the plurality of blocks.

15. The apparatus of claim 7, wherein the system control facilities include:

means, coupled to receive the data and control information from the first and second service processing means, for setting and querying data locations within the plurality of blocks; and means, coupled to blocks of integrated circuits, for setting and querying input/output pins within the plurality of blocks, including facility interfacing means, having a block address and coupled to receive the data and control information from the first and second service processing means when addressed by the block address, for communicating the data and control information with the first and second service processing means.

16. The apparatus of claim 15, wherein the arbitrating means includes:

first interfacing means, connected to a first set of the plurality of blocks and the facility interfacing means and responsive to block addresses, for transferring data and control signals to and from addressed blocks in the first set and the facility interfacing means;

first selecting means, connected to the first interfacing means, the first service processing means and the second service processing means, for selecting the first service processing means or the second service processing means for access to the system control facilities in the first set;

second interfacing means, connected to a second set of the plurality of blocks and the facility interfacing means and responsive to block addresses, for transferring data and control signals to and from addressed blocks in the second set and the facility interfacing means;

second selecting means, connected to the second interfacing means, the first service processing means and the second service processing means, for selecting the first service processing means or the second service processing means for access to the system control facilities in the second set.

* * * * *